(12) United States Patent
Gupta et al.

(10) Patent No.: US 11,693,789 B2
(45) Date of Patent: Jul. 4, 2023

(54) SYSTEM AND METHOD FOR MAPPING OBJECTS TO REGIONS

(71) Applicant: Nutanix, Inc., San Jose, CA (US)

(72) Inventors: Karan Gupta, San Jose, CA (US);
Gowtham Alluri, San Jose, CA (US);
Dheer Moghe, Bangalore (IN); Anshul Purohit, San Jose, CA (US); Arth Patel, Gujarat (IN); Ajay Raghavan, San Jose, CA (US); Roger Liao, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 17/539,896

(22) Filed: Dec. 1, 2021

(65) Prior Publication Data
US 2022/0091996 A1   Mar. 24, 2022

Related U.S. Application Data

(63) Continuation of application No. 16/526,914, filed on Jul. 30, 2019, now Pat. No. 11,226,905.

(60) Provisional application No. 62/827,763, filed on Apr. 1, 2019.

(51) Int. Cl.
*G06F 3/00* (2006.01)
*G06F 12/109* (2016.01)
*G06F 3/06* (2006.01)

(52) U.S. Cl.
CPC .......... *G06F 12/109* (2013.01); *G06F 3/064* (2013.01); *G06F 3/067* (2013.01); *G06F 3/0629* (2013.01); *G06F 3/0631* (2013.01); *G06F 3/0638* (2013.01); *G06F 3/0643* (2013.01); *G06F 3/0647* (2013.01); *G06F 3/0649* (2013.01); *G06F 2212/7201* (2013.01)

(58) Field of Classification Search
None
See application file for complete search history.

(56) References Cited

U.S. PATENT DOCUMENTS

| | | |
|---|---|---|
| 6,209,128 B1 | 3/2001 | Gerard et al. |
| 6,775,673 B2 | 8/2004 | Mahalingam et al. |
| 7,653,668 B1 | 1/2010 | Shelat et al. |
| 8,019,732 B2 | 9/2011 | Paterson-Jones et al. |

(Continued)

FOREIGN PATENT DOCUMENTS

WO   WO-2022062777 A1 *  3/2022

OTHER PUBLICATIONS

Machine translation of JP2015-531920A [Nov. 5, 2015].*

(Continued)

*Primary Examiner* — Midys Rojas
(74) *Attorney, Agent, or Firm* — Foley & Lardner LLP

(57) ABSTRACT

An illustrative embodiment disclosed herein is an apparatus including a processor and a memory. In some embodiments, the memory includes programmed instructions that, when executed by the processor, cause the apparatus to store a first object and a second object in a first region based on the first object and the second object having a first policy. In some embodiments, the memory includes programmed instructions that, when executed by the processor, cause the apparatus to store a third object in a second region based on the third object having a second policy. In some embodiments, a virtual disk includes the first region and the second region.

23 Claims, 7 Drawing Sheets

(56) References Cited

U.S. PATENT DOCUMENTS

| | | |
|---|---|---|
| 8,166,128 B1 | 4/2012 | Faulkner et al. |
| 8,250,033 B1 | 8/2012 | De Souter et al. |
| 8,352,424 B2 | 1/2013 | Zunger et al. |
| 8,549,518 B1 | 10/2013 | Aron et al. |
| 8,554,724 B2 | 10/2013 | Zunger |
| 8,601,473 B1 | 12/2013 | Aron et al. |
| 8,849,759 B2 | 9/2014 | Bestler et al. |
| 8,850,130 B1 | 9/2014 | Aron et al. |
| 8,863,124 B1 | 10/2014 | Aron |
| 8,930,693 B2 | 1/2015 | Holt et al. |
| 9,009,106 B1 | 4/2015 | Aron et al. |
| 9,043,372 B2 | 5/2015 | Makkar et al. |
| 9,052,942 B1 | 6/2015 | Barber et al. |
| 9,069,708 B2 | 6/2015 | Gill et al. |
| 9,069,983 B1 | 6/2015 | Nijjar |
| 9,336,132 B1 | 5/2016 | Aron et al. |
| 9,405,806 B2 | 8/2016 | Lysne et al. |
| 9,652,265 B1 | 5/2017 | Narayanasamy et al. |
| 9,747,287 B1 | 8/2017 | Bhardwaj et al. |
| 9,772,866 B1 | 9/2017 | Aron et al. |
| 9,805,054 B2 | 10/2017 | Davis et al. |
| 10,003,650 B2 | 6/2018 | Shetty et al. |
| 10,380,078 B1 | 8/2019 | Kumar et al. |
| 10,409,837 B1 | 9/2019 | Schmidt et al. |
| 10,740,302 B2 | 8/2020 | Slik et al. |
| 10,747,752 B2 | 8/2020 | Krishnaswamy et al. |
| 2003/0023587 A1 | 1/2003 | Dennis et al. |
| 2006/0080646 A1 | 4/2006 | Aman |
| 2011/0082962 A1 | 4/2011 | Horovitz et al. |
| 2011/0213884 A1 | 9/2011 | Ferris et al. |
| 2012/0096052 A1 | 4/2012 | Tolia et al. |
| 2012/0331243 A1 | 12/2012 | Aho et al. |
| 2013/0332608 A1 | 12/2013 | Shiga et al. |
| 2015/0378767 A1 | 12/2015 | Tarasuk-Levin et al. |
| 2016/0048408 A1 | 2/2016 | Madhu et al. |
| 2016/0092326 A1 | 3/2016 | Wu et al. |
| 2016/0275125 A1 | 9/2016 | Drobychev et al. |
| 2017/0075909 A1 | 3/2017 | Goodson et al. |
| 2017/0109421 A1 | 4/2017 | Stearn et al. |
| 2017/0242746 A1 | 8/2017 | King et al. |
| 2017/0344575 A1 | 11/2017 | Naylor et al. |
| 2017/0351450 A1 | 12/2017 | Brandl et al. |
| 2018/0292999 A1 | 10/2018 | Nadkarni |
| 2019/0004863 A1 | 1/2019 | Mainali et al. |
| 2019/0050296 A1 | 2/2019 | Luo et al. |
| 2019/0213179 A1 | 7/2019 | McHugh et al. |
| 2020/0034063 A1* | 1/2020 | Somasundaram .. G06F 9/45558 |
| 2020/0036787 A1 | 1/2020 | Gupta et al. |
| 2020/0387510 A1 | 12/2020 | Ransil et al. |
| 2021/0294499 A1 | 9/2021 | Wang et al. |

OTHER PUBLICATIONS

"Adding Objects to Versioning—Enabled Buckets", from https://docs.aws.amazon.com/AmazonS3/latest/dev/AddingObjectstoVersioningEnabledBuckets.html, (Oct. 2, 2019).

"AWS Pricing"; Amazon Web Services; https://aws.amazon.com/pricing/; Webpage accessed on Jun. 23, 2021; pp. 1-9.

"Cloud & Hosting Services—Building a Cloud Infrastructure"; NetApp; https://www.netapp.com/hybrid-cloud/service-provider-infrastructure/; webpage accessed on Jun. 23, 2021; pp. 1-11.

"Configure a Pod to Use a ConfigMap", from https://kubernetes.io/docs/tasks/configure-pod-container/configure-pod-configmap/,(Oct. 2, 2019).

"Creating an NFS file share"; AWS Storage Gateway—User Guide; https://docs.aws.amazon.com/storagegateway/latest/userguide/CreatingAnNFSFileShare.html; webpage accessed on Oct. 28, 2020; pp. 1-10.

"Deployments", from https://kubernetes.io/docs/concepts/workloads/controllers/deployment/,(Oct. 2, 2019).

"IT Service Provider Technology Solutions and Services"; HPE—Hewlett Packard; https://www.hpe.com/us/en/solutions/service-providers.html?parentPage=/us/en/solutions/service-providers; Webpage accessed on Jun. 23, 2021; pp. 1-6.

"Managed VMware Cloud Services"; VMware; https://cloud.vmware.com/providers/managed-services-provider; Webpage accessed on Jun. 23, 2021; pp. 1-5.

"Managing your storage lifecycle"; Amazon Simple Storage Service; https://docs.aws.amazon.com/AmazonS3/latest/userguide/object-lifecycle-mgmt.html; webpage accessed on Jun. 18, 2021; pp. 1-2.

"Nutanix Solution for Service Providers"; Nutanix, Inc. Solution Brief; https://aemstage.nutanix.cn/viewer?type=pdf&path=/content/dam/nutanix/resources/solution-briefs/sb-service-provider-solution-brief.pdf&icid=67VMYKPR6K6O; 2020; pp. 1-3.

"PerVirtual Machine Licensing"; VMware Per VM Pricing & Licensing Help; https://www.vmware.com/support/support-resources/licensing/per-vm.html; Webpage accessed on Jun. 23, 2021; pp. 1-7.

"Retrieving Object Versions", from https://docs.aws.amazon.com/AmazonS3/latest/dev/RetrievingObjectVersions.html, (Oct. 2, 2019).

"Set up Cluster Federation with Kubefed—Kubernetes", from https://v1-14.docs.kubernetes.io/docs/tasks/federation/set-up-cluster-federation-kubefed/, (Apr. 17, 2020).

"Storage Tiering"; VMWARE Docs; https://docs.vmware.com/en/VMware-Validated-Design/5.0/com.vmware.wd.sddc-design.doc/GUID-20D2BC02-4500-462F-A353-F9B613CC07AC.html; webpage accessed on Jun. 18, 2021; pp. 1-3.

"SwiftOnFile"; Object Storage-Gluster Docs; v: releases.7.0beta1; https://staged-gluster-docs.readthedocs.io/en/release3.7.0beta1/Administrator%20Guide/Object%20Storage/; webpage accessed on Oct. 28, 2020; pp. 1-2.

"Transitioning objects using Amazon S3 Lifecycle"; Amazon Simple Storage Service; https://docs.aws.amazon.com/AmazonS3/latest/userguide/lifecycle-transition-general-considerations.html; Webpage was accessed on Jun. 18, 2021; pp. 1-5.

"Using Amazon S3 storage classes"; Amazon Simple Storage Service; https://docs.aws.amazon.com/AmazonS3/latest/userguide/storage-class-intro.html; Webpage accessed on Jun. 16, 2021; pp. 1-6.

"Volumes", from https://kubernetes.io/docs/concepts/storage/volumes/, (Oct. 2, 2019).

B Tree Indexes. http://web.csulb.edu/-amonge/classes/common/db/B TreeIndexes.html, Aug. 4, 2018, pp. 1-7 (2018).

Cano, Ignacio, et al. "Curator: Self-Managing Storage for Enterprise Clusters" (Mar. 27, 2017), from https://www.usenix.org/conference/nsdi17/.

Gowri Balasubramanian; "Should Your DynamoDB Table Be Normalized or Denormalized?"; AWS Database Blog; https://aws.amazon.com/blogs/database/should-your-dynamodb-table-be-normalized-or-denormalized/; Dec. 5, 2016; pp. 1-5.

Luis Ayuso; "How to Report Monthly Usage with the Flex Pricing Model"; VMware Cloud Provider Blog; May 20, 2019; pp. 1-6.

Luis Ayuso; "How to Sign Up for the new VCPP Flex Pricing Model"; VMware Cloud Provider Blog; May 20, 2019; pp. 1-6.

Luis Ayuso; "New VCPP Pricing Model Simplifies Delivering Services"; VMware Cloud Provider Blog; May 20, 2019; pp. 1-6.

Michael Bose; "A Guide on How to Mount Amazon S3 as a Drive for Cloud File Sharing"; Nakivo Blog-Cloud-Backup to Cloud; https://www.nakivo.com/blog/mount-amazon-s3-as-a-drive-how-to-guide/; Published Jun. 17, 2020; pp. 1-27.

Mike Deck; "Building and Maintaining an Amazon S3 Metadata Index witnout Servers"; AWS Big Data Blog; https://aws.amazon.com/blogs/big-data/building-and-maintaining-an-amazon-s3-metadata-index-without-servers/; Aug. 12, 2015; pp. 1-6.

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Sep. 17, 2019), from https://nutanixbible.com/.

Poitras, Steven. "The Nutanix Bible" (Jun. 20, 2014), from http://stevenpoitras.com/the-nutanix-bible/ (Publication date based on indicated capture date by Archive.org; first publication date unknown).

(56) References Cited

OTHER PUBLICATIONS

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Stopford. Log Structured Merge Trees, http://www.benstopford.com/2015/02/14/ log-structured-merge-trees, 2015, pp. 1-8 (2015).

The Nutanix Bible; from https://nutanixbible.com/; accessed on Jan. 12, 2016.

The Nutanix Bible; from https://nutanixbible.com/; accessed on Jun. 25, 2018.

The Nutanix Bible; from https://nutanixbible.com/; accessed on Jan. 3, 2017.

The Nutanix Bible; from https://nutanixbible.com/; accessed on Jan. 3, 2018.

The Nutanix Bible; from https://nutanixbible.com/; accessed on Sep. 4, 2015.

The Nutanix Bible; from https://nutanixbible.com/; accessed on Jan. 8, 2019.

The Nutanix Bible; from https://nutanixbible.com/; accessed on Jun. 8, 2017.

The Nutanix Bible; from https://nutanixbible.com/; accessed on Jun. 9, 2016.

Wambler, Choosing a Primary Key: Natural or Surrogate? http://www.agiledata.org/essays/keys.html, 2018, pp. 1-4 (2018).

* cited by examiner

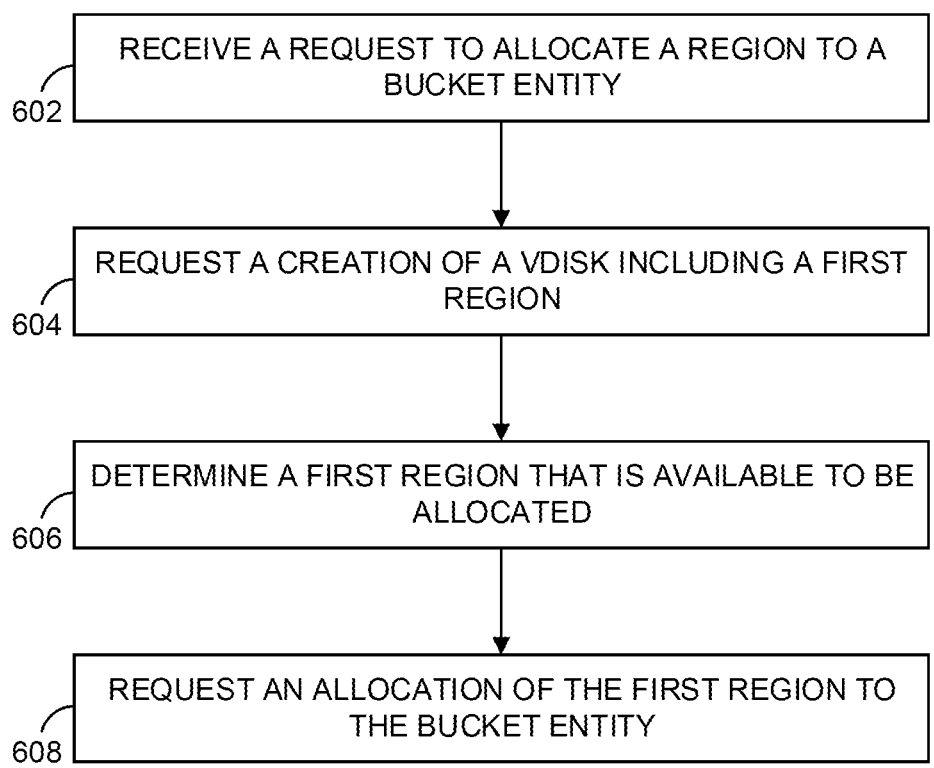

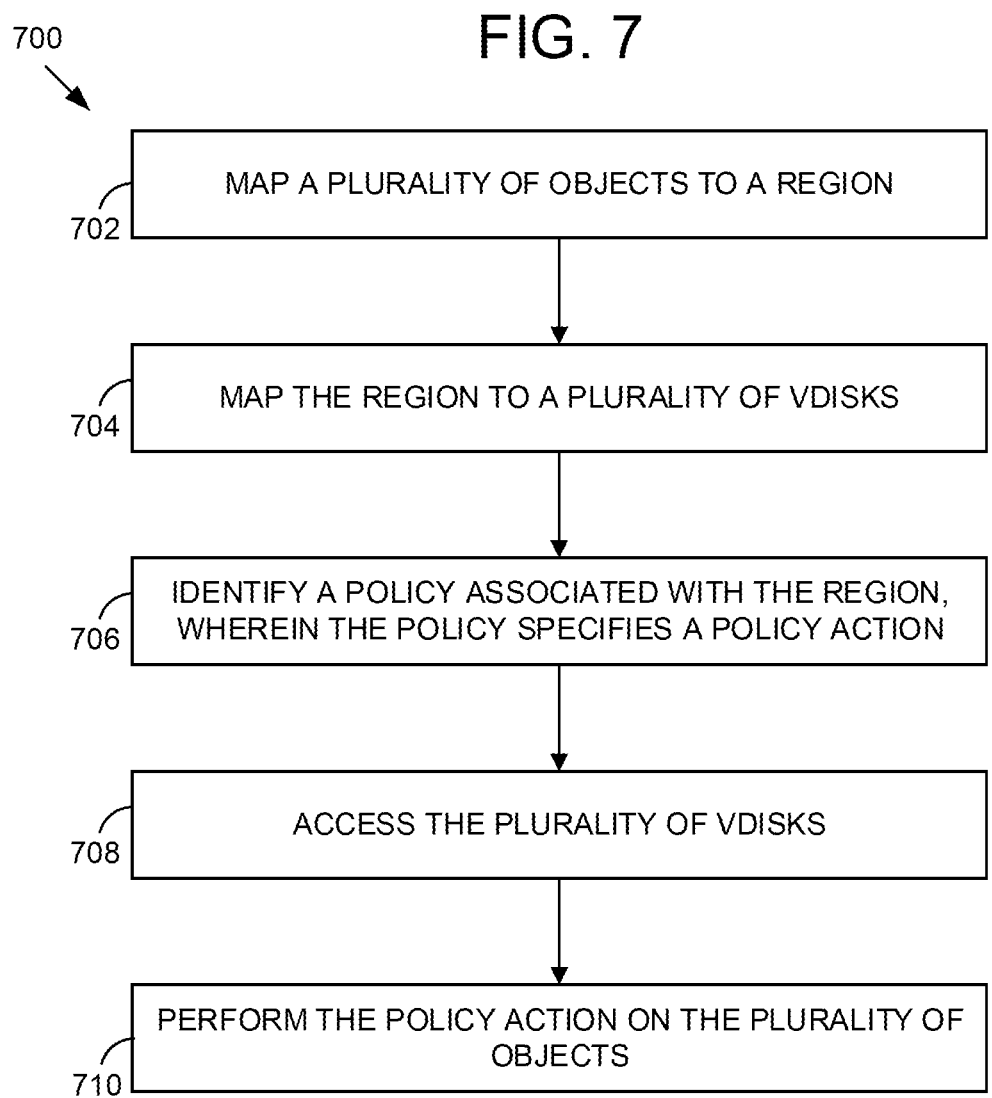

SYSTEM AND METHOD FOR MAPPING OBJECTS TO REGIONS

CROSS-REFERENCE TO RELATED APPLICATION

This application is related to and claims priority under 35 U.S. § 120 as a continuation of U.S. patent application Ser. No. 16/526,914, filed Jul. 30, 2019, titled "SYSTEM AND METHOD FOR MAPPING OBJECTS TO REGIONS," which claims priority under 35 U.S. § 119(e) from U.S. Patent Application No. 62/827,763, filed Apr. 1, 2019, titled "SYSTEM AND METHOD FOR MAPPING OBJECTS TO REGIONS," the entire contents of which are incorporated herein by reference for all purposes.

BACKGROUND

Virtual computing systems are widely used in a variety of applications. Virtual computing systems include one or more host machines running one or more virtual machines concurrently. The virtual machines utilize the hardware resources of the underlying host machines. Each virtual machine may be configured to run an instance of an operating system. Modern virtual computing systems allow several operating systems and several software applications to be safely run at the same time on the virtual machines of a single host machine, thereby increasing resource utilization and performance efficiency. However, the present-day virtual computing systems have limitations due to their configuration and the way they operate.

SUMMARY

Aspects of the present disclosure relate generally to a virtualization environment, and more particularly to a system and method for mapping objects to regions.

An illustrative embodiment disclosed herein is an apparatus including a processor and a memory. In some embodiments, the memory includes programmed instructions that, when executed by the processor, cause the apparatus to store a first object and a second object in a first region based on the first object and the second object having a first policy. In some embodiments, the memory includes programmed instructions that, when executed by the processor, cause the apparatus to store a third object in a second region based on the third object having a second policy. In some embodiments, a virtual disk includes the first region and the second region.

Another illustrative embodiment disclosed herein is a non-transitory computer readable storage medium. In some embodiments, the medium includes instructions stored thereon that, upon execution by a processor, causes the processor to store a first object and a second object in a first region based on the first object and the second object having a first policy. In some embodiments, the medium includes instructions stored thereon that, upon execution by a processor, causes the processor to store a third object in a second region based on the third object having a second policy. In some embodiments, a virtual disk includes the first region and the second region.

Another illustrative embodiment disclosed herein is a computer-implemented method, including storing a first object and a second object in a first region based on the first object and the second object having a first policy. In some embodiments, the method includes storing a third object in a second region based on the third object having a second policy. In some embodiments, a virtual disk includes the first region and the second region.

Further details of aspects, objects, and advantages of the disclosure are described below in the detailed description, drawings, and claims. Both the foregoing general description and the following detailed description are exemplary and explanatory and are not intended to be limiting as to the scope of the disclosure. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 6 is an example method for allocating a region, in accordance with some embodiments of the present disclosure; and FIG. 7 is an example method for managing policies, in accordance with some embodiments of the present disclosure.

Figure 1:
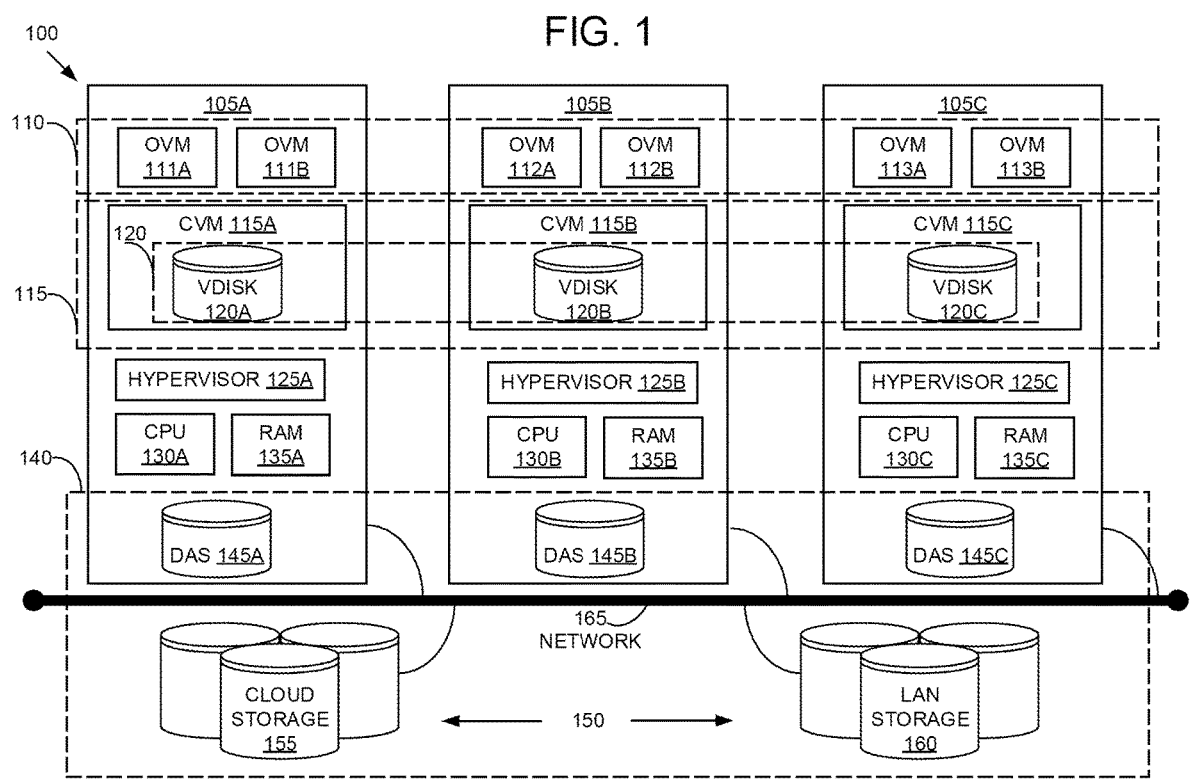
FIG. 1 is an example block diagram of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

A bucket may be a container of objects having a same policy flavor. In conventional systems, the objects having the same policy flavor may be stored across multiple storage locations. Thus, to change multiple objects having a same policy flavor, a storage location of each of the objects having the policy flavor has to be identified one at a time. This leads to higher latency, higher input/output (I/O) usage, and higher resource utilization in serving requests of multiple objects having a single policy flavor. In some instances, there may be a bottleneck at a CVM or other entity for managing I/O requests. Thus, there exists a technical challenge of performing actions based on policies while maintaining minimum latency, minimum I/O usage, and minimum resource usage.

Embodiments of the disclosure described herein are directed to systems and methods for mapping buckets to regions. One or more resources associated with the region manager may partition the virtual disks into regions. The one or more resources associated with a region manager may allocate a region to the first bucket. The one or more resources associated with a region manager region may cause storing of objects of the first bucket in the allocated region. The present disclosure includes a technical solution to the technical problem performing actions based on policies while maintaining minimum latency and minimum resource usage. Policies are region-bound rather than object-bound. For instance, data migration, replication, and deletion become more straightforward. In order to change the set of objects having the same policy flavor, identifying the region may be sufficient. Performing region-centric actions results in lower latency, and lower I/O usage, and less resource utilization in serving a request for a set of objects having a single policy flavor.

Object Virtualization Technology and Environment

Referring now to FIG. 1, a virtual computing system 100 is shown, in accordance with some embodiments of the present disclosure. The virtual computing system 100 includes a plurality of nodes, such as a first node 105A, a second node 105B, and a third node 105C. The nodes may be collectively referred to herein as "nodes 105." Each of the nodes 105 may also be referred to as a "host" or "host machine." The first node 105A includes an object virtual machine ("OVMs") 111A and 111B (collectively referred to herein as "OVMs 111"), a controller virtual machine ("CVM") 115A, and a hypervisor 125A. Similarly, the second node 105B includes OVMs 112A and 112B (collectively referred to herein as "OVMs 112"), a CVM 115B, and a hypervisor 125B, and the third node 105C includes OVMs 113A and 113B (collectively referred to herein as "OVMs 113"), a CVM 115C, and a hypervisor 125C. The OVMs 111, 112, and 113 may be collectively referred to herein as "OVMs 110." The CVMs 115A, 115B, and 115C may be collectively referred to herein as "CVMs 115." The nodes 105 are connected to a network 165.

The virtual computing system 100 also includes a storage pool 140. The storage pool 140 may include network-attached storage (NAS) 150 and direct-attached storage (DAS) 145A, 145B, and 145C (collectively referred to herein as DAS 145). The NAS 150 is accessible via the network 165 and, in some embodiments, may include cloud storage 155, as well as local area network ("LAN") storage 160. In contrast to the NAS 150, which is accessible via the network 165, each of the DAS 145A, the DAS 145B, and the DAS 145C includes storage components that are provided internally within the first node 105A, the second node 105B, and the third node 105C, respectively, such that each of the first, second, and third nodes may access its respective DAS without having to access the network 165.

The CVM 115A may include one or more virtual disks ("vdisks") 120A, the CVM 115B may include one or more vdisks 120B, and the CVM 115C may include one or more vdisks 120C. The vdisks 120A, the vdisks 120B, and the vdisks 120C are collectively referred to herein as "vdisks 120." The vdisks 120 may be a logical representation of storage space allocated from the storage pool 140. Each of the vdisks 120 may be located in a memory of a respective one of the CVMs 115. The memory of each of the CVMs 115 may be a virtualized instance of underlying hardware, such as the RAMS 135 and/or the storage pool 140. The virtualization of the underlying hardware is described below.

In some embodiments, the CVMs 115 may be configured to run a distributed operating system in that each of the CVMs 115 run a subset of the distributed operating system. In some such embodiments, the CVMs 115 form one or more Nutanix Operating System ("NOS") cluster. In some embodiments, the one or more NOS clusters include greater than or fewer than the CVMs 115. In some embodiments, each of the CVMs 115 run a separate, independent instance of an operating system. In some embodiments, the one or more NOS clusters may be referred to as a storage layer. In some embodiments, one or more NOS clusters (herein referred to as NOS) host, have access to, and/or include one or more components of the storage pool 140.

In some embodiments, the OVMs 110 form an OVM cluster. OVMs of an OVM cluster may be configured to share resources with each other. The OVMs in the OVM cluster may be configured to access storage from the NOS cluster using one or more of the vdisks 120 as a storage unit. The OVMs in the OVM cluster may be configured to run software-defined object storage service, such as Nutanix Buckets™. The OVM cluster may be configured to create buckets, add objects to the buckets, and manage the buckets and objects. In some embodiments, the OVM cluster include greater than or fewer than the OVMs 110.

Multiple OVM clusters and/or multiple NOS clusters may exist within a given virtual computing system (e.g., the virtual computing system 100). The one or more OVM clusters may be referred to as a client layer or object layer. The OVM clusters may be configured to access storage from multiple NOS clusters. Each of the OVM clusters may be configured to access storage from a same NOS cluster. A central management system, such as Prism Central, may manage a configuration of the multiple OVM clusters and/or multiple NOS clusters. The configuration may include a list of OVM clusters, a mapping of each OVM cluster to a list of NOS clusters from which the OVM cluster may access storage, and/or a mapping of each OVM cluster to a list of vdisks that the OVM cluster owns or has access to.

Each of the OVMs 110 and the CVMs 115 is a software-based implementation of a computing machine in the virtual computing system 100. The OVMs 110 and the CVMs 115 emulate the functionality of a physical computer. Specifically, the hardware resources, such as CPU, memory, storage, etc., of a single physical server computer (e.g., the first node 105A, the second node 105B, or the third node 105C) are virtualized or transformed by the respective hypervisor (e.g. the hypervisor 125A, the hypervisor 125B, and the hypervisor 125C), into the underlying support for each of the OVMs 110 and the CVMs 115 that may run its own operating system, a distributed operating system, and/or applications on the underlying physical resources just like a real computer. By encapsulating an entire machine, including CPU, memory, operating system, storage devices, and network devices, the OVMs 110 and the CVMs 115 are compatible with most standard operating systems (e.g. Windows, Linux, etc.), applications, and device drivers. Thus, each of the hypervisors 125 is a virtual machine monitor that allows the single physical server computer to run multiple instances of the OVMs 110 (e.g. the OVM 111) and at least one instance of a CVM 115 (e.g. the CVM 115A), with each of the OVM instances and the CVM instance sharing the resources of that one physical server computer, potentially across multiple environments. By running the multiple instances of the OVMs 110 on a node of the nodes 105, multiple workloads and multiple operating systems may be run on the single piece of underlying hardware computer to increase resource utilization and manage workflow.

The hypervisors 125 of the respective nodes 105 may be configured to run virtualization software, such as, ESXi from VMWare, AHV from Nutanix, Inc., XenServer from Citrix Systems, Inc., etc. The virtualization software on the hypervisors 125 may be configured for managing the interactions between the respective OVMs 110 (and/or the CVMs 115) and the underlying hardware of the respective nodes 105. Each of the CVMs 115 and the hypervisors 125 may be configured as suitable for use within the virtual computing system 100.

In some embodiments, each of the nodes 105 may be a hardware device, such as a server. For example, in some embodiments, one or more of the nodes 105 may be an NX-1000 server, NX-3000 server, NX-5000 server, NX-6000 server, NX-8000 server, etc. provided by Nutanix, Inc. or server computers from Dell, Inc., Lenovo Group Ltd. or Lenovo PC International, Cisco Systems, Inc., etc. In other embodiments, one or more of the nodes 105 may be another type of hardware device, such as a personal computer, an input/output or peripheral unit such as a printer, or any type of device that is suitable for use as a node within the virtual computing system 100. In some embodiments, the virtual computing system 100 may be part of a data center.

The first node 105A may include one or more central processing units ("CPUs") 130A, the second node 105B may include one or more CPUs 130B, and the third node 105C may include one or more CPUs 130C. The CPUs 130A, 130B, and 130C are collectively referred to herein as the CPUs 130. The CPUs 130 may be configured to execute instructions. The instructions may be carried out by a special purpose computer, logic circuits, or hardware circuits of the first node 105A, the second node 105B, and the third node 105C. The CPUs 130 may be implemented in hardware, firmware, software, or any combination thereof. The term "execution" is, for example, the process of running an application or the carrying out of the operation called for by an instruction. The instructions may be written using one or more programming language, scripting language, assembly language, etc. The CPUs 130, thus, execute an instruction, meaning that they perform the operations called for by that instruction.

The first node 105A may include one or more random access memory units ("RAM") 135A, the second node 105B may include one or more RAM 135B, and the third node 105C may include one or more RAM 135C. The RAMs 135A, 135B, and 135C are collectively referred to herein as the RAMs 135. The CPUs 130 may be operably coupled to the respective one of the RAMs 135, the storage pool 140, as well as with other elements of the respective ones of the nodes 105 to receive, send, and process information, and to control the operations of the respective underlying node. Each of the CPUs 130 may retrieve a set of instructions from the storage pool 140, such as, from a permanent memory device like a read only memory ("ROM") device and copy the instructions in an executable form to a temporary memory device that is generally some form of random access memory ("RAM"), such as a respective one of the RAMs 135. One of or both of the ROM and RAM be part of the storage pool 140, or in some embodiments, may be separately provisioned from the storage pool. The RAM may be stand-alone hardware such as RAM chips or modules. Further, each of the CPUs 130 may include a single stand-alone CPU, or a plurality of CPUs that use the same or different processing technology.

Each of the DAS 145 may include a variety of types of memory devices. For example, in some embodiments, one or more of the DAS 145 may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. Likewise, the NAS 150 may include any of a variety of network accessible storage (e.g., the cloud storage 155, the LAN storage 160, etc.) that is suitable for use within the virtual computing system 100 and accessible via the network 165. The storage pool 140, including the NAS 150 and the DAS 145, together form a distributed storage system configured to be accessed by each of the nodes 105 via the network 165, one or more of the OVMs 110, one or more of the CVMs 115, and/or one or more of the hypervisors 125.

Each of the nodes 105 may be configured to communicate and share resources with each other via the network 165, including the respective one of the CPUs 130, the respective one of the RAMs 135, and the respective one of the DAS 145. For example, in some embodiments, the nodes 105 may communicate and share resources with each other via one or more of the OVMs 110, one or more of the CVMs 115, and/or one or more of the hypervisors 125. One or more of the nodes 105 may be organized in a variety of network topologies.

The network 165 may include any of a variety of wired or wireless network channels that may be suitable for use within the virtual computing system 100. For example, in some embodiments, the network 165 may include wired connections, such as an Ethernet connection, one or more twisted pair wires, coaxial cables, fiber optic cables, etc. In other embodiments, the network 165 may include wireless connections, such as microwaves, infrared waves, radio waves, spread spectrum technologies, satellites, etc. The network 165 may also be configured to communicate with another device using cellular networks, local area networks, wide area networks, the Internet, etc. In some embodiments, the network 165 may include a combination of wired and wireless communications.

Although three of the plurality of nodes (e.g., the first node 105A, the second node 105B, and the third node 105C) are shown in the virtual computing system 100, in other embodiments, greater than or fewer than three nodes may be used. Likewise, although only two of the OVMs are shown on each of the first node 105A (e.g. the OVMs 111), the second node 105B, and the third node 105C, in other embodiments, greater than or fewer than two OVMs may reside on some or all of the nodes 105.

It is to be understood again that only certain components and features of the virtual computing system 100 are shown and described herein. Nevertheless, other components and features that may be needed or desired to perform the functions described herein are contemplated and considered within the scope of the present disclosure. It is also to be understood that the configuration of the various components of the virtual computing system 100 described above is only an example and is not intended to be limiting in any way. Rather, the configuration of those components may vary to perform the functions described herein.

Mapping Objects to Regions

Objects are collections of unstructured data that includes object data and object metadata describing the object or the object data. In some embodiments, the object metadata includes one or more unique identifiers. A bucket is a logical construct that is used to store objects in an underlying storage technology. In some embodiments, the bucket includes references to object data associated with the bucket. In some embodiments, the bucket includes a data structure that maps object identifiers to locations in the underlying storage technology where the objects associated with the object identifiers are stored. In some embodiments, the bucket has policies that determine how the objects associated with the bucket are managed, updated, and replicated, among others. The objects can be associated to the buckets by users and/or the policies. The buckets can be partitioned into bucket partitions.

Buckets or Object Storage Service (OSS) is a layered service being built over NOS. OSS uses the power of the NOS offering and builds an efficient and scalable object store service on top. Clients (e.g., client devices or client applications) read and write objects to the OSS and use GET and PUT calls for read and write operations. In some embodiments, an entire object is written and partial writes, appends or overwrites are not permitted. For reads and writes, data flows through OSS components before being stored in NOS storage. The OSS may run on one or more OVMs. The OSS is herein referred to as the object layer.

Buckets and objects can be stored on entities in, or associated with, the NOS, such as vdisks. Vdisks are logical constructs that are backed by physical storage such as the storage pool 140 with respect to FIG. 1. In some embodiments, a vdisk on a same node as a CVM appears to the CVM as a local SAN or NAS storage. The CVM reads or writes to the vdisk using, for example, SCSI or NFS protocol. In some embodiments, the vdisk encapsulates the SCSI commands in iSCSI and sends the iSCSI commands across the network to the SAN hardware that is backing the vdisk. In some embodiments, the vdisk encapsulates and/or forwards the NFS commands across the network to the NAS storage that is backing the vdisk.

Figure 2:
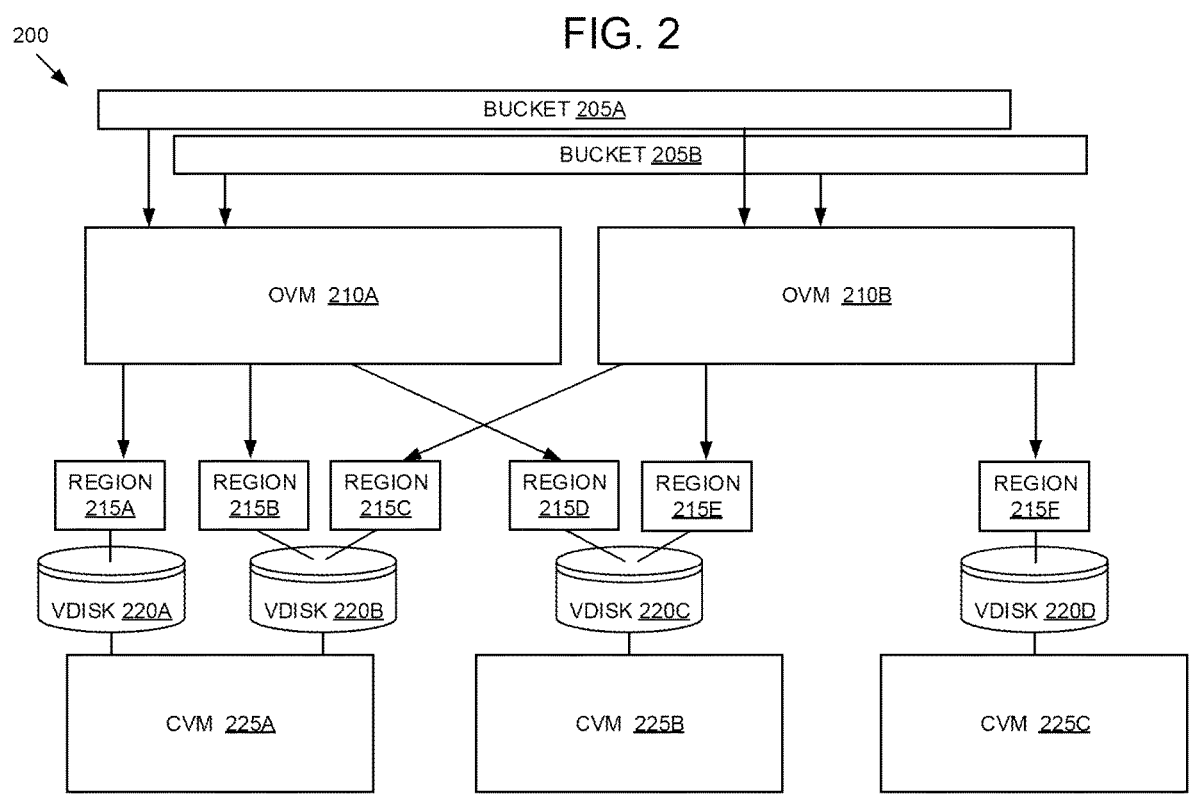
FIG. 2 is an example block diagram of an environment for mapping objects to regions, in accordance with some embodiments of the present disclosure.

Referring now to FIG. 2, an example embodiment of an environment 200 for mapping objects to regions is shown. In brief overview, the environment 200 includes bucket 205A and bucket 205B (collectively referred to herein as "buckets 205"). Each of the buckets are coupled to object virtual machine (OVM) 210A and OVM 210B (collectively referred to herein as "OVM 210"). The OVM 210A is coupled to controller virtual machine (CVM) 225A and CVM 225B. The OVM 210B is coupled to the CVM 225B and CVM 225C. The CVMs 225A, 225B, and 225C are collectively referred to herein as "CVMs 225." Each of the CVMs may be referred to as a data node. A subset of the CVMs 225 may be referred to as a data store. The CVMs 225 include virtual disks (referred to herein as "vdisks"). For example, the CVM 225A includes a vdisk 220A and a vdisk 220B, the CVM 225B includes a vdisk 220C, and the CVM 225C includes a vdisk 220D. The vdisks 220A, 220B, 220C, and 220D are collectively referred to herein as "vdisks 220." One or more of the vdisks 220 may be included in a container. Each of the vdisks 220 include regions. For example, the vdisk 220A includes a region 215A, the vdisk 220B includes a region 215B and a region 215C, the vdisk 220C includes a region 215D and a region 215E, and the vdisk 220D includes a region 215F. The regions 215A, 215B, 215C, 215D, 215E, and 215F are collectively referred to herein as "regions 215."

Each of the elements or entities of the virtual computing system 100 and the environment 200 (e.g., each of the buckets 205, the OVMs 210, the regions 215, the vdisks 220, and the CVMs 225) is implemented using hardware or a combination of hardware or software, in one or more embodiments. For instance, each of these elements or entities can include any application, program, library, script, task, service, process or any type and form of executable instructions executing on hardware of the virtual computing system 100, and/or and the environment 200. The hardware includes circuitry such as one or more processors (e.g., the CPU 130A) in one or more embodiments. Each of the one or more processors is hardware. The buckets 205, the OVMs 210, the regions 215, the vdisks 220, the CVMs 225, or a combination thereof may be an apparatus including a processor having programmed instructions. The instructions may be stored on one or more computer readable and/or executable storage media including non-transitory storage media such as non-transitory storage media in the storage pool 140 with respect to FIG. 1.

Each of the buckets 205 (and/or bucket partitions) may include one or more objects. Each of the objects may be associated with a policy flavor. The policy flavor may include multiple policies each of which is directed to a different feature or aspect of the object, such as encryption, migration, replication, deletion, tiering, or garbage collection, among others. Some objects in a same bucket may have different policy flavors. For example, a first object in the bucket 205A may have a first policy for encryption and a first policy for replication, and a second object in the bucket 205A may have a second policy for encryption and a second policy for replication. The one or more objects or object chunks are written to one or more vdisks, as described below.

Each of the vdisks 220 may be created by any of the OVMs 210. Once a vdisk such as the vdisk 220A is created, it may be associated to the respective OVM, such as the OVM 210A, until the vdisk is closed. Each OVM may write to and read from any of the vdisks associated with the OVM. There may be multiple open vdisks associated per OVM. Each OVM may create a vdisk, such as the vdisk 220A. The vdisk may be associated with and/or hosted on a CVM on the same node as the vdisk. In some embodiments, the OVM that creates the vdisk assigns the vdisk to the CVM. In some embodiments, the environment 200 includes a vdisk map. The vdisk map may include an identifier of the vdisk, a next available offset (e.g. an offset corresponding to a next vdisk region that has not been allocated yet), an identifier of an owning OVM (e.g. which OVM created, is associated with, and/or opened the vdisk), an identifier of a CVM that is hosting the open vdisk, and/or a status of whether the vdisk is open or closed. The vdisk information may be read at an index corresponding to a vdisk identifier. In some embodiments, the index may correspond to a key. In some embodiments, the key is a hash of the vdisk identifier. The vdisk map may be implemented as a data structure. The vdisk map data structure and any other data structure described herein may be implemented as an array, an indexed array, a multi-level indexed array, a table, a lookup table (LUT), a tree, and/or a key-value store, among others.

An OVM may open a vdisk for writes. Any of the OVMs 210 may write the one or more objects to one or more open vdisks 220. Objects from more than one bucket may be written to one open vdisk such as vdisk 220A. When the open vdisk becomes full, the OVM may close the vdisk. In some embodiments, the environment 200 includes an open vdisk map. The open vdisk may map OVMs to open vdisks. Determining which OVM owns the vdisk may include reading a vdisk identifier at an index corresponding to an OVM identifier. The OVM identifier may include a string name, and a numeric identifier, concatenation of the name and the numeric identifier, and the like. The open vdisk map may be implemented as a data structure.

Vdisks may be subdivided (e.g., chunked) into multiple fixed-size regions. For example, the vdisk 220B includes the region 215B and the region 215C. An OVM, such as the OVM 210A, may allocate a region on the vdisk. In some embodiments, the OVM may allocate, or map, the region to a collection of chunks of different vdisks. The OVM may allocate the region to a bucket and/or one or more objects with a same policy or policy flavor. One or more regions may be allocated to the bucket or object. In some embodiments, a region is allocated exclusively to the bucket and/or one or more objects. The allocation of regions to the buckets or objects may be stored in a region map. The region map may be implemented as a data structure. Allocating a region may be defined herein as setting boundaries (e.g., offset and length of the vdisk) on a space in a vdisk and associating the bounded space with a region identifier. Allocating may be referred to as creating. Mapping the region to a bucket or object may be defined herein as mapping the allocated vdisk space to the bucket and/or one or more objects. Allocating the region to the bucket or object may be referred to as allocating the region and, in addition, mapping the allocated region to the bucket and/or one or more objects.

In some embodiments, a policy is associated all of the objects in the region. For example, a first object, a second object, and a third object in the region may each have a first encryption policy, a first replication policy, a first tiering policy, and a first garbage collection policy. In some embodiments, the OVM 210A identifies the policy associated with the region. The policy may specify a policy action in response to satisfying a predetermined condition. In some embodiments, the OVM 210A performs a policy action on a group of objects mapped to, or stored in, the region. In some embodiments, the OVM 210A sends an API request to perform a policy action to a CVM 225A on which the region is hosted. Actions on objects, such as identification, modification, deletion, migration, or replication, among others, which are based on the policy of the objects, may be performed at a region level rather than an object level. For example, an operation to delete all objects which have a first policy flavor may be implemented by determining if a region corresponds to the first policy flavor and, responsive to determining that the region corresponds to the first policy flavor, deleting all of the objects in the region. Determining whether a region corresponds to a first policy flavor may include reading the policy flavors an index, corresponding to the region, of a data structure.

In some embodiments, policies can be implemented on an entire region that includes objects with the same policy flavor. In some embodiments, a deletion policy for a first region has a rule to delete objects older than a pre-determined number of days ago. In some embodiments, the deletion policy includes maintaining a count of days starting on a date that the objects are created and increasing the count by one every day. In some embodiments, the OVM 210A or the CVM 225A implements a deletion policy. Implementing the deletion policy may include creating a first list of objects with a key including an expiration date, which is a sum of the date the objects are created and the pre-determined number of days. Implementing deletion policy may include creating the first list of objects with a key including the count. Implementing the deletion policy may include, upon determining that today is the expiration date and/or upon determining that the count is equal to the pre-determined number of days, keying the first list with the expiration date, deleting all of the objects on the list, deleting the dangling object metadata, and deleting the list.

The OVMs 210 may be instances of the OVM 111A with respect to FIG. 1. The vdisks 220 may be instances of the vdisk 120A with respect to FIG. 1. The CVMs 225 may be instances of the CVM 115A with respect to FIG. 1. Although two buckets, two OVMs, six regions, four vdisks, and three CVMs are shown in the environment 200, in other embodiments, greater than or fewer than any of the two buckets, the two OVMs, the six regions, the four vdisks, and the three CVMs may be used. Although each of the buckets 205 are shown as coupled to each of the OVMs 210 in the environment 200, in other embodiments, any of the buckets 205 may be coupled to other OVMs. A bucket can be served by any OVM.

Figure 3:
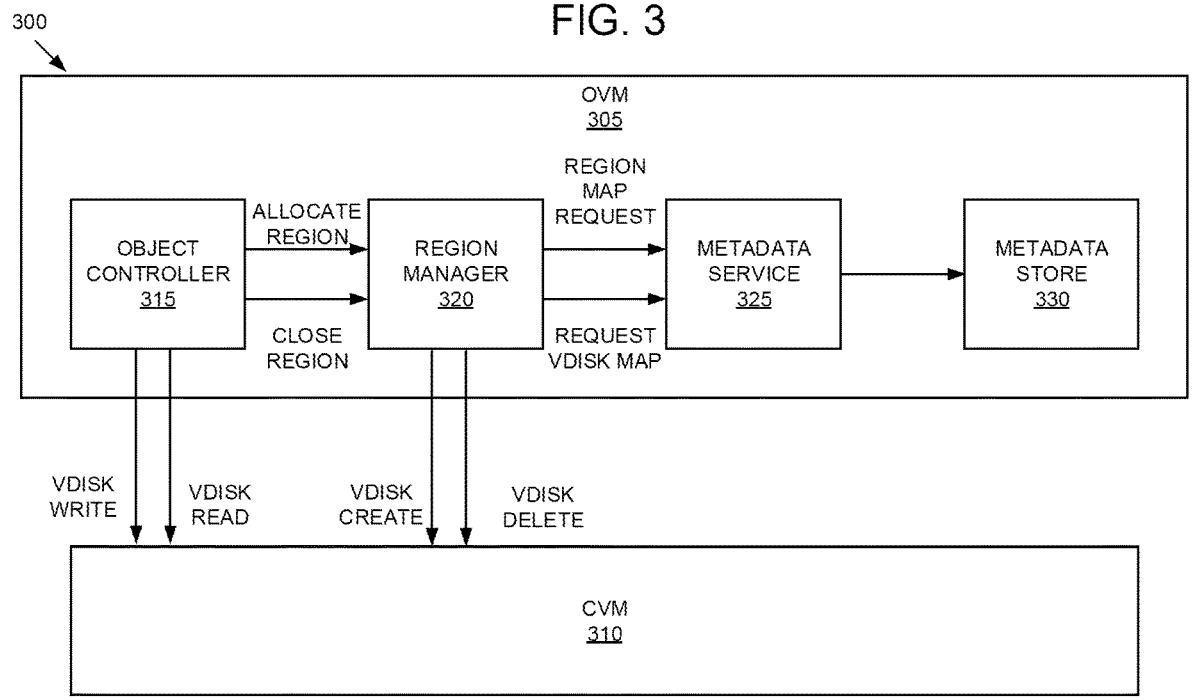
FIG. 3 is an example block diagram of an OVM-CVM environment, in accordance with some embodiments of the present disclosure.

Referring now to FIG. 3, an example embodiment of an OVM-CVM environment 300 for is shown. In brief overview, the OVM-CVM environment 300 includes an OVM 305 and a CVM 310 coupled to the OVM 305. The OVM 305 includes an object controller 315, a region manager 320, a metadata service 325, and a metadata store 330. The OVM-CVM environment can be referred to as the OSS-NOS environment.

Each of the elements or entities of the OVM-CVM environment 300 (e.g., the OVM 305, the CVM 310, the object controller 315, the region manager 320, the metadata service 325, and the metadata store 330) is implemented using hardware or a combination of hardware or software, in one or more embodiments. For instance, each of these elements or entities can include any application, program, library, script, task, service, process or any type and form of executable instructions executing on hardware of the OVM-CVM environment 300. The hardware includes circuitry such as one or more processors (e.g., the CPU 130A) in one or more embodiments. Each of the one or more processors is hardware. The OVM 305, the CVM 310, the object controller 315, the region manager 320, the metadata service 325, and the metadata store 330, or a combination thereof may be an apparatus including a processor having programmed instructions. The instructions may be stored on one or more computer readable and/or executable storage media including non-transitory storage media such as non-transitory storage media in the storage pool 140 with respect to FIG. 1.

The object controller 315 may include a processor having programmed instructions (hereinafter, the object controller 315 may include programmed instructions) to receive and serve object requests from a client, including requests to create, read, write, and delete. The object controller 315 may serve object requests corresponding to multiple buckets or bucket partitions. The client object request may be in accordance with REST API protocol. The client object request may include parameters associated with the object such as an object identifier, a bucket identifier, and/or a bucket partition identifier.

The object controller 315 may include programmed instructions to store any data associated with the client request in memory. The memory may on the node that is hosting the object controller 315. The memory may be physical or virtual. In some embodiments, the object controller 315 maintains a checksum for the object data. In some embodiments, the object controller 315 computes an MD5 sum of the data.

The object controller 315 may include programmed instructions to send a request to the region manager 320 to allocate a region (e.g., space of one or more vdisks) to a bucket. The allocated region may be allocated for writing and reading objects of the bucket. Responsive to the region manager 320 allocating the region to the bucket, an endpoint CVM, such as the CVM 310, or a component thereof, may include programmed instructions to write to and read from the region. The object controller 315 may include programmed instructions to send a request to the region manager 320 to receive an identifier of (and/or identifier of a node associated with) the endpoint CVM for requesting vdisk reads and vdisk writes.

Once the endpoint CVM in the NOS is determined, the object controller 315 may include programmed instructions to send a request to the endpoint CVM. The endpoint CVM may be the CVM that hosts the vdisk. The request may include a request to open the vdisk, to read an object from the vdisk, and/or to write an object to the vdisk. In some embodiments, the object controller 213A populates metadata associated with the object and writes the metadata to a metadata server (e.g. the metadata service 325 and/or the metadata store 330). The metadata may include an object identifier, a bucket identifier, a region identifier, an object handle, an object key, an object key-value pair, a vdisk location and/or identifier, and/or a physical disk location and/or identifier, among others.

The object controller 315 may include programmed instructions to send a second request to the region manager 320 to close the region. Responsive to the region being in a closed state, the endpoint CVM may deny further write requests from the object controller 315. The object controller 315 may include programmed instructions to request vdisk reads of closed vdisks from a second CVM, for example, through a proxy vdisk controller on the second CVM.

The region manager 320 may include a processor having programmed instructions (hereinafter, the region manager 320 may include programmed instructions) to manage region allocations for a NOS cluster of one or more CVMs such as the CVM 310. The region manager 320 may include programmed instructions to load balance vdisk allocations across CVMs and region allocations across vdisks. The region manager 320 may include programmed instructions to provide APIs for region allocation to the object controller 315.

In some embodiments, the region manager 320 runs as a part of a metadata service acting in a master slave model where all the region allocations and vdisk allocations are handled centrally by the master. The object controllers in all of the OVMs may issue remote procedure calls (RPCs) to the region manager 320 to perform a region allocation. In some embodiments, the region manager 320 runs inside an object store process. In some embodiments, region manager 320 running inside the object store process handles vdisk allocations and region allocations for an OVM locally.

The metadata service 325 may include a processor having programmed instructions (hereinafter, the metadata service 325 may include programmed instructions) to serve requests for looking up and updating metadata associated with an object read request or an object write request from the object controller 315. The metadata service 325 may be assigned to metadata of objects that reside in a subset of buckets or bucket partitions. The metadata service 325 may include programmed instructions to serve the metadata update request by storing the metadata in a data structure in the metadata store 330. The metadata service 325 may include programmed instructions to serve the metadata lookup or update request by looking up or updating a metadata entry that is located at an index in the data structure in the metadata store 330. The index may be a key derived from a hash of one or more object parameters associated with the object. The metadata service 325 may receive from the object controller 315 the index associated with the metadata lookup.

The metadata store 330 is a log-structured-merge (LSM) based key-value store including key-value data structures in memory and/or persistent storage. The data structures may be implemented as indexed arrays including metadata entries and corresponding indices. The indices may be represented numerically or strings. Each metadata entry includes a key-value pair including a key and one or more values. The key may be a hash of an object handle associated with an object whose metadata is stored in the metadata entry. The object handle may include the object identifier, the bucket identifier, the bucket partition identifier, and the like. The data structures may be implemented as separate arrays for each object. The data structures may be implemented as multi-dimensional arrays, where each object is assigned to a row and each version of the object is assigned to a column in that row.

The OVM 305 may be instances of the OVM 111A with respect to FIG. 1. The CVM 310 may be instances of the CVM 115A with respect to FIG. 1. Although the object controller 315, the region manager 320, the metadata service 325, and the metadata store 330 are shown inside one OVM, in other embodiments, the object controller 315, the region manager 320, the metadata service 325, and the metadata store 330 may be spread across multiple OVMs. Although one OVM, one CVM, one object controller, one region manager, one metadata service, and one metadata store are shown in the environment 200, in other embodiments, greater than or fewer than any of the one OVM, the one CVM, the one object controller, the one region manager, the one metadata service, and the one metadata store may be used.

Figure 4:
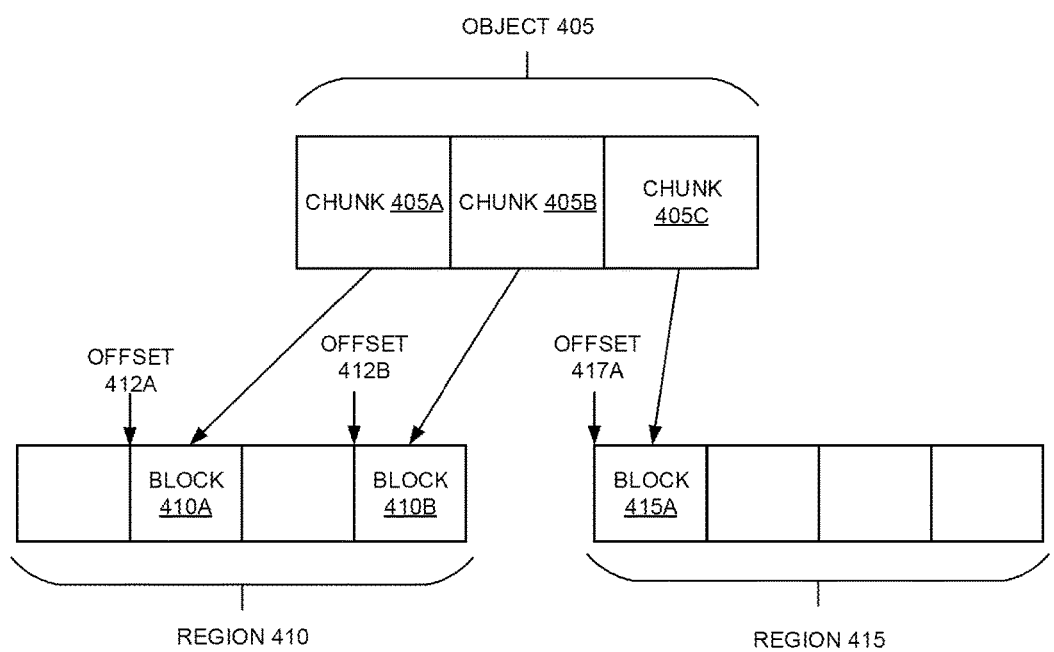
FIG. 4 is an example block diagram of object-region environment, in accordance with some embodiments of the present disclosure.

Referring now to FIG. 4, an example embodiment of object-region environment 400 is shown. The object-region environment 400 may be in the virtual computing system 100, the environment 200, and/or the OVM-CVM environment 300. The object-region environment 400 includes an object 405, a region 410, and a region 415. The object 405 includes chunk 405A, chunk 405B, and chunk 405C. The region 410 includes a block 410A and block 410B. The block 410A starts at an offset 412A of the region 410 and the block 410B starts at an offset 412B of the region 410. The region 415 may include the block 415A starting at an offset of 417A of the region 415.

In some embodiments, object chunks of an object are written to different regions. For example, the chunks 405A and 405B are written to the region 410 and the chunk 405C is written to the region 415. More specifically in the example, the chunk 405A is written to the block 410A, the chunk 405B is written to the block 410B, and the chunk 405C is written to the block 415A. In some embodiments, a region is written to by appending the object chunk to a first available block of a region. That is, a region is written to a region block that is located logically after all of the region blocks that have been written to. In some embodiments, a filesystem is associated with regions. In some embodiments, the filesystem is associated only with regions for objects smaller than a pre-determined size threshold. The filesystem may be offset and length based. The filesystem may enable the client to reuse blocks that have been freed. For example, when writing an object chunk to a region associated with the filesystem, the filesystem exposes the region as rows and columns. The object chunk can be written to a specific row and/or specific column.

Figure 5:
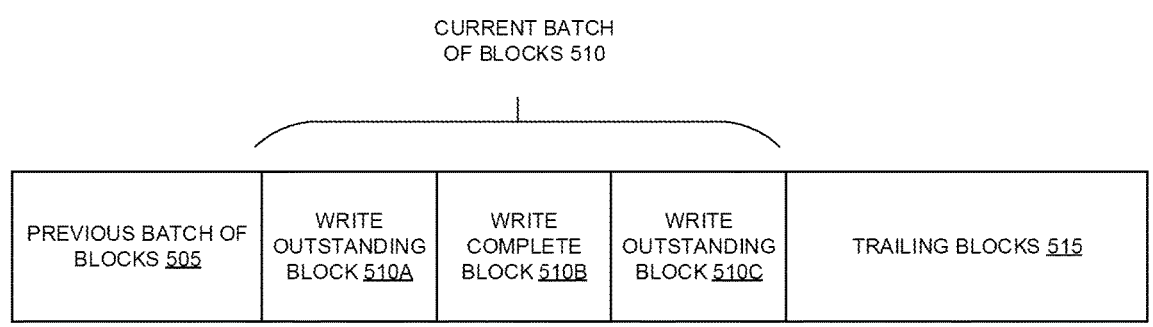
FIG. 5 is an example block diagram of an open region, in accordance with some embodiments of the present disclosure.

Referring now to FIG. 5, an example embodiment of an open region 500 shown. The open region 500 may be in the virtual computing system 100, the environment 200, and/or the OVM-CVM environment 300. In brief overview, the open region 500 includes previous batch of blocks 505, current batch of blocks 510, and trailing blocks 515. The current batch of blocks 510 may include a write outstanding block 510A, a write complete block 510B, and a write outstanding block 510C.

Writes to a region can happen in batches. That is, multiple object chunks can be written to multiple region blocks in parallel. One or more components, such as the object controller 315, the region manager 320, or the CVM 310, of a system, such as the OVM-CVM environment 300, may crash before completing the current batch of writes to some of the blocks, such as the write outstanding blocks 510A and 510C, of the open region 500. The write outstanding blocks 510A and 510C may be garbage data (e.g., the corresponding object chunks may not be read from the respective write outstanding blocks).

One or more components, such as the object controller 315, the region manager 320, or the CVM 310, of the system may include a processor having programmed instructions (hereinafter, the one or more components include programmed instructions) to clean up the open region 500 after the crash. In some embodiments, the one or more components include programmed instructions identify a crash associated with the open region 500. In some embodiments, the one or more components may include programmed instructions to determine a last block that has been successfully written to, such as the write complete block 510B. The one or more components may include programmed instructions delete all of the blocks located after the blocks that has been successfully written to, such as the write outstanding block 510C and the trailing blocks 515 (which are empty blocks). The one or more components may include programmed instructions to identify unsuccessfully written to blocks (e.g., outstanding write block 510A) before the last successfully written to block. The one or more components may identify the unsuccessfully written to blocks by searching for all the blocks that do not map to any object chunks. The search may be sequential. A prior search may narrow the searchable blocks to those blocks that have a timestamp corresponding to the last batch write before the crash. The one or more components may include programmed instructions to delete the outstanding write block 510A.

Referring now to FIG. 6, an example method 600 for allocating a region is shown. The method 600 for allocating a region may be implemented using, or performed by, the components of the virtual computing system 100, the environment 200, and/or the OVM-CVM environment 300, each of which are detailed herein with respect to FIG. 1, FIG. 2, and FIG. 3. The method 600 for allocating a region may be implemented using, or performed by, the OVM 210A, a processor associated with the OVM 210A, the region manager 320, or a processor associated with the region manager 320. Additional, fewer, or different operations may be performed in the method 600 depending on the embodiment.

At operation 602, a region manager, such as the region manager 320, may receive a request from a client to allocate a region to a bucket or an object associated with the client. At operation 604, the region manager may send a request to a CVM, such as the CVM 310, to create a vdisk, such as the vdisk 220A. In some embodiments, the region manager may update the vdisk map by sending a request to a metadata service, such as the metadata service 325, to create an entry in the vdisk map corresponding to the vdisk created at operation 604. The vdisk entry may include information about the vdisk including a vdisk identifier, an identifier of the region manager that requested creation of the vdisk, and/or an identifier of the CVM that created the vdisk. The vdisk may include regions.

At operation 606, the region manager may determine a first region, on the vdisk, that is available to be allocated. The first region may be determined by finding an available region at a vdisk offset that is higher than any region that was previously allocated. Additionally or alternatively, the first region may be determined by finding an available region at a vdisk offset that is lower than any region that was not previously allocated. At operation 608, the region manager may update a region map by sending a request to the metadata service to create an entry for the first region. The region entry for the first region may include an identifier of the bucket or one or more objects associated with the request. Thus, the first region is allocated to the bucket or one or more objects. The region manager may send a callback to the client identifying the allocated region.

Referring now to FIG. 7, an example method 700 for managing policies is shown. The method 700 for managing policies may be implemented using, or performed by, the components of the virtual computing system 100, the environment 200, and/or the OVM-CVM environment 300, each of which are detailed herein with respect to FIG. 1, FIG. 2, and FIG. 3. The method 700 for managing policies may be implemented using, or performed by, the OVM 210A, a processor associated with the OVM 210A, the object controller 315, a processor associated with the object controller 315, the region manager 320, a processor associated with the region manager 320, or a combination thereof. Additional, fewer, or different operations may be performed in the method 700 depending on the embodiment.

At operation 702, an OVM, such as the OVM 210A, maps a plurality of objects to a region. In some embodiments, the OVM maps a bucket to a region and the region includes the plurality of objects. At operation 704, the OVM maps the region to a plurality of vdisks. In some embodiments, the plurality of objects are stored in the plurality of vdisks. In some embodiments, the vdisks are on nodes located in disparate geographical locations. That is, each of the plurality of vdisks is hosted on a node in a different geographical location than nodes on which others of the plurality of vdisks are hosted. In some embodiments, the OVM partitions the virtual disk into a first portion and a second portion. The first portion is mapped to the region and the second portion is mapped to a second region.

At operation 706, the OVM identifies a policy associated with the region, wherein the policy specifies a policy action. In some embodiments, the policy action is a lifecycle action. In some embodiments, the policy action is a migration, replication, or deletion. In some embodiments, the policy action is in response to satisfying a predetermined condition. In some embodiments, the OVM associates the region to the policy. In some embodiments, the OVM generates a data structure and stores the association of the region and the policy on the data structure. In some embodiments, operation 706 is responsive to operation 702 and/or operation 704. At operation 708, the OVM accesses the plurality of vdisks.

At operation 710, the OVM performs the policy action on the plurality of objects. In some embodiments, operations 708 and 710 are in response to satisfying the predetermined condition.

It is to be understood that any examples used herein are simply for purposes of explanation and are not intended to be limiting in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents.

What is claimed:

1. An apparatus comprising a processor and a memory, wherein the memory includes programmed instructions that, when executed by the processor, cause the apparatus to:
   store a first object and a second object in a first region based on the first object and the second object having a first policy, wherein a virtual disk includes the first region;
   store a third object in a second region based on the third object having a second policy different from the first policy, wherein the virtual disk includes the second region; and
   perform a policy action in accordance with the first policy on the first object and the second object, based on the first object and the second object being in the first region.

2. The apparatus of claim 1, wherein the policy action includes to delete the first object and the second object, based on the first object and the second object being in the first region, in response to determining that an expiration date of the first region has elapsed.

3. The apparatus of claim 1, wherein the memory includes the programmed instructions that, when executed by the processor, further cause the apparatus to:
   partition the virtual disk into the first region and the second region.

4. The apparatus of claim 1, wherein the memory includes the programmed instructions that, when executed by the processor, further cause the apparatus to:
   write a first object chunk to the first region, wherein the first region is associated with a file system.

5. The apparatus of claim 4, wherein the memory includes the programmed instructions that, when executed by the processor, further cause the apparatus to:

write a second object chunk to the second region, wherein the first object chunk and the second object chunk are written in parallel.

6. The apparatus of claim 1, wherein the memory includes the programmed instructions that, when executed by the processor, further cause the apparatus to:
identify an outstanding write associated with the first region; and
delete the outstanding write from the first region.

7. The apparatus of claim 1, wherein the policy action includes to replicate the first object and the second object, based on the first object and the second object being in the first region.

8. The apparatus of claim 1, wherein the memory includes the programmed instructions that, when executed by the processor, further cause the apparatus to:
associate the first region with the first policy.

9. A non-transitory computer readable storage medium comprising instructions stored thereon that, upon execution by a processor, cause the processor to:
store a first object and a second object in a first region based on the first object and the second object having a first policy, wherein a virtual disk includes the first region;
store a third object in a second region based on the third object having a second policy, wherein the virtual disk includes the second region; and
perform a policy action in accordance with the first policy on the first object and the second object, based on the first object and the second object being in the first region.

10. The medium of claim 9, wherein the policy action includes to delete the first object and the second object, based on the first object and the second object being in the first region, in response to determining that an expiration date of the first region has elapsed.

11. The medium of claim 9, comprising the instructions stored thereon that, when executed by the processor, further cause the processor to:
partition the virtual disk into the first region and the second region.

12. The medium of claim 9, comprising the instructions stored thereon that, when executed by the processor, further cause the processor to:
write a first object chunk to the first region, wherein the first region is associated with a file system.

13. The medium of claim 12, comprising the instructions stored thereon that, when executed by the processor, further cause the processor to:
write a second object chunk to the second region, wherein the first object chunk and the second object chunk are written in parallel.

14. The medium of claim 9, comprising the instructions stored thereon that, when executed by the processor, further cause the processor to:
identify an outstanding write associated with the first region; and
delete the outstanding write from the first region.

15. The medium of claim 9, wherein the policy action includes to replicate the first object and the second object, based on the first object and the second object being in the first region.

16. The medium of claim 9, comprising the instructions stored thereon that, when executed by the processor, further cause the processor to:
associate the first region with the first policy.

17. A computer-implemented method comprising:
storing, by a processor, a first object and a second object in a first region based on the first object and the second object having a first policy, wherein a virtual disk includes the first region;
storing, by the processor, a third object in a second region based on the third object having a second policy, wherein the virtual disk includes the second region; and
performing a policy action in accordance with the first policy on the first object and the second object, based on the first object and the second object being in the first region.

18. The method of claim 17, further comprising:
partitioning the virtual disk into the first region and the second region.

19. The method of claim 17, further comprising:
writing a first object chunk to the first region, wherein the first region is associated with a file system.

20. The method of claim 19, further comprising:
writing a second object chunk to the second region, wherein the first object chunk and the second object chunk are written in parallel.

21. The method of claim 17, further comprising:
identifying an outstanding write associated with the first region; and
deleting the outstanding write from the first region.

22. The method of claim 17, wherein the policy action includes to replicate the first object and the second object, based on the first object and the second object being in the first region.

23. The method of claim 17, further comprising:
associating the first region with the first policy.

* * * * *